United States Patent [19]
Cobb et al.

[11] B 3,914,471

[45] Oct. 21, 1975

[54] METHOD OF PRODUCING METALLIZED THERMOPLASTIC ARTICLES

[75] Inventors: Leslie Hamilton Cobb, Harpenden; David Mann, St. Albans; Timothy Alan Remmington, Hertford, all of England

[73] Assignee: Imperial Chemical Industries Limited, London, England

[22] Filed: Jan. 25, 1972

[21] Appl. No.: 220,683

[44] Published under the Trial Voluntary Protest Program on January 28, 1975 as document no. B 220,683.

[30] Foreign Application Priority Data
Feb. 9, 1971   United Kingdom................. 4259/71

[52] U.S. Cl. ................ 427/250; 427/320; 427/321; 427/383

[51] Int. Cl.² ......................................... C23C 13/02
[58] Field of Search.......... 117/35, 138.8 E, 138.8 F, 117/47, 62, 107, 107.1, 237, 160 R; 427/250, 320, 321, 383

[56] References Cited
UNITED STATES PATENTS

| | | | |
|---|---|---|---|
| 2,740,732 | 4/1956 | Peck et al. | 117/35 |
| 3,431,135 | 3/1969 | Keane et al. | 117/107 |

*Primary Examiner*—Charles E. Van Horn
*Assistant Examiner*—J. Massie
*Attorney, Agent, or Firm*—Cushman, Darby & Cushman

[57] ABSTRACT

Heating metallised thermoplastic, particularly polyethylene terephthalate film, either before or after deposition of the metal coating.

5 Claims, No Drawings

METHOD OF PRODUCING METALLIZED THERMOPLASTIC ARTICLES

This invention relates to the production of the metallised thermoplastic materials and in particular to improved metallised films especially metallised films of crystalline polyesters and polyolefines.

Metallised films particularly of polyesters find widespread use, but one problem is that for certain applications the metal may too readily be removed from the film and the metal to film bond tends to fail when laminated to a substrate which is flexed thus making the film unsatisfactory in these applications. Another drawback is that in certain circumstances blocking occurs between adjacent layers of metallised film in a reel of film so that the adjacent layers stick together.

We have now found that if the thermoplastic is heated either before or after application of the metal layer it becomes more difficult to remove the metal layer from the film and the degree of blocking is reduced.

According to the present invention, we provide a process for the production of metallised thermoplastic materials comprising depositing a metal layer by vapour deposition on the thermoplastic material in which the improvement comprises heating the thermoplastic material to a temperature which is below the melting point of the thermoplastic material either before or after the application of the metal layer.

Although the present invention is broadly described in terms of thermoplastics in general, it is primarily concerned with metallised films.

The temperature to which the thermoplastic should be heated depends upon the nature of the thermoplastic and the length of time for which it is heated. This may be determined by simple experimentation. The reason for the apparent improvement in the adhesion of the metallised layer to the thermoplastic material is not fully understood. However, one theory, in the case of polyethylene terephthalate, is that it may be due to the migration of certain materials, such as diethylene glycol or oligomers, e.g., dimers or trimers, of glycol terephthalate to the surface during heat treatment. These materials may then form a layer on the surface of the metallised film which protects the metal layer from the forces which would otherwise remove the metal. Thus the heat treatment should not be carried out for too long as this tends to vaporise the materials which form the protective layer. The heating may be effected before or after the application of the metal layer although we prefer to heat immediately after the application of the metal layer before the film is wound into a reel. The films may be heated in any suitable manner, the most convenient being to pass the film through an oven containing air heated to the required temperature which depends upon the nature of the thermoplastic material from which the films are made. In the case of polyethylene terephthalate we have found that the film should be heated to between 80°C and 200°C, generally from about 100°C upwards, for a short time, for instance 30 seconds to 10 minutes. In general, heating for a time up to about 5 minutes is sufficient. The temperature should be below the melting point of the thermoplastic and in the case of the metallisation of oriented thermoplastic films, we prefer that the temperature is below that at which the film has been heat set to impart dimensional stability to the film.

For certain materials, particularly polyolefine films we prefer that their surface be subjected to a treatment to improve the bonding properties of that surface before the metal layer is applied. This treatment may be a physical or a chemical treatment which oxidises the film surface and thus improves its bonding properties. Examples of suitable chemical treatments are treatment with oxidising agents such as chromic acid in sulphuric acid, hot nitric acid or exposure of the surface to ozone. Alternatively, the surface may be subjected to exposure of the surface to corona discharge (such treatment is described in British Specification No. 715,914) exposure of the surface to ionising radiation, or exposure of the surface to a flame for a sufficient time to cause superficial oxidation but not long enough to cause distortion of its surface. The preferred treatment, because of its effectiveness and simplicity, is the high voltage electric stress accompanied by corona discharge.

The application of metal layers to thermoplastic materials according to this invention is effected by directing a stream of metal vapour onto the surface of the thermoplastic by a vacuum evaporation technique. In these techniques the metal is heated in a high vacuum typically in the range $10^{-3}$ to $10^{-5}$ torr, to a temperature which exceeds its melting point such that the vapour pressure of the metal is greater than approximately $10^{-2}$ torr. Under these conditions the metal vaporises emitting molecular rays in all directions. These molecular rays impinge upon the substrate, condense and so form a thin metallic film over the substrate.

The process of the present invention is applicable to the deposition of all metal coatings on thermoplastics and is particularly applicable to zinc, aluminium, copper and gold.

The present invention is also concerned with metallised films produced by the process of the present invention and therefore provides organic thermoplastic films coated with a metal layer.

The process and product of the present invention relates to all thermoplastic materials and in particular to films of any organic thermoplastic polymeric material, for example polymers and copolymers of alpha olefines such as ethylene, propylene, butene and 4-methyl pentene-1; linear polyesters such as polyethylene terephthalate and polyethylene-1:2-diphenoxyethane-4:4'-dicarboxylate, polymers and copolymers containing vinyl chloride, polyamides, polyimides and polysulphones; blends of these polymers may also be used. Films which are metallised by this invention may be unoriented or may be oriented in one or both directions in the plane of the film and if oriented in both directions the orientation may be equal in those directions or unequal, for example with the higher degree of orientation in a preferred direction (usually the longitudinal direction). Our invention is particularly applicable to oriented films of polypropylene and polyethylene terephthalate and the metallised films are useful for the manufacture of capacitors or may be slit to produce decorative textile yarns.

The present invention is illustrated but in no way limited by reference to the accompanying examples, in which samples of oriented and heat set films of polyethylene terephthalate which were metallised by conventional vapour deposition metallising techniques were heated before and after metallising and the amount of metal which could be removed from the film measured. The test which was used was to stick a piece of "Sellotape" 1109 to the metallised surface of the film, peel off the piece of "Sellotape" and determine how much metal had been removed.

EXAMPLE 1

| Diethylene glycol content of film | Amount of metal removed - no heating | Amount of metal removed after heating metallised film at 100°C for 5 minutes | Amount of metal removed when film is heated at 100°C for 5 minutes and then metallised |
|---|---|---|---|
| 1.5–2% | 5% | 0% | 5% |
| 3.7% | 10% | 0% | 2% |
| 10% | 45% | 0% | 0% |

EXAMPLE 2

The process of Example 1 was repeated using the film which contained from 1.5%–2% by weight of diethylene glycol. The metallised film was heated to 180°C for a few minutes and then tested for metal removal when hot and when it had been allowed to cool. In both instances it was not possible to remove any of the metal coating.

We claim:

1. A process for the production of a metallized oriented thermoplastic film, the steps of which consist essentially of vapour depositing a metal layer directly on the surface of an oriented and heat set thermoplastic film and thereafter heating the so-metallized film to a temperature of between 80°C. and 200°C. but below the temperature at which the film has been heat set.

2. A process according to claim 1 wherein the film is a polyester film.

3. A process according to claim 2 wherein the metal layer is aluminium.

4. A process according to claim 1, in which the thermoplastic material is polyethylene terephthalate and is heated for 30 seconds to 10 minutes.

5. A process according to claim 1, in which the metal layer comprises zinc, aluminium, copper or gold.

* * * * *